US012590470B2

(12) United States Patent
Kritzer

(10) Patent No.: US 12,590,470 B2
(45) Date of Patent: Mar. 31, 2026

(54) DOUBLE-WIDE INDEPENDENT PLATFORM PARKING LIFT

(71) Applicant: BendPak, Inc., Santa Paula, CA (US)

(72) Inventor: Jeffrey S. Kritzer, Moorpark, CA (US)

(73) Assignee: BendPak, Inc., Agoura Hills, CA (US)

( * ) Notice: Subject to any disclaimer, the term of this patent is extended or adjusted under 35 U.S.C. 154(b) by 349 days.

(21) Appl. No.: 18/495,241

(22) Filed: Oct. 26, 2023

(65) Prior Publication Data

US 2024/0141671 A1 May 2, 2024

Related U.S. Application Data

(60) Provisional application No. 63/381,481, filed on Oct. 28, 2022.

(51) Int. Cl.
*E04H 6/06* (2006.01)
*B66F 7/02* (2006.01)

(52) U.S. Cl.
CPC ................. *E04H 6/06* (2013.01); *B66F 7/02* (2013.01)

(58) Field of Classification Search
CPC .... E04H 6/06; E04H 6/12; E04H 6/14; E04H 6/18; E04H 6/188; B66F 1/00; B66F 1/02; B66F 1/04; B66F 1/06; B66F 7/02; B66F 7/025; B66F 7/04
See application file for complete search history.

(56) References Cited

U.S. PATENT DOCUMENTS

| | | | | |
|---|---|---|---|---|
| 3,706,356 | A | 12/1972 | Herbst et al. | |
| 4,641,596 | A | 2/1987 | Reprogle et al. | |
| 4,674,938 | A * | 6/1987 | Van Stokes | B66F 7/04 187/253 |
| 6,106,210 | A | 8/2000 | Toxer | |
| 7,143,869 | B1 * | 12/2006 | Chance | B66F 17/00 187/253 |
| 2009/0321189 | A1 | 12/2009 | Schmitt | |
| 2010/0089845 | A1 | 4/2010 | Fässler et al. | |
| 2012/0018255 | A1 | 1/2012 | Gross | |
| 2020/0232238 | A1 * | 7/2020 | Kritzer | E04H 6/26 |

FOREIGN PATENT DOCUMENTS

| | | | |
|---|---|---|---|
| CN | 104018709 | A | 9/2014 |
| CN | 203924808 | U | 11/2014 |
| CN | 108331400 | A | 7/2018 |
| CN | 211622794 | U | 10/2020 |
| WO | 2017168689 | A1 | 10/2017 |
| WO | 2020224837 | A1 | 11/2020 |

* cited by examiner

*Primary Examiner* — Tyrone V Hall, Jr.
(74) *Attorney, Agent, or Firm* — AVEK IP, LLC; Kent R. Erickson

(57) ABSTRACT

A double-wide, independent platform vehicle lift has vehicle platforms engaged with a framework by guide members which engage guide tracks in posts. Each platform has at least one corner which has a guide member that engages a depending receptacle when the platform is lifted to a selected height by operation of a respective linear actuator.

15 Claims, 7 Drawing Sheets

DOUBLE-WIDE INDEPENDENT PLATFORM PARKING LIFT

CROSS-REFERENCE TO RELATED APPLICATIONS

This application claims the benefit of U.S. Provisional Patent Application No. 63/381,481, filed Oct. 28, 2022, the disclosure of which is hereby incorporated herein in its entirety by reference.

BACKGROUND OF THE INVENTION

Field of the Invention

This invention relates to a vehicle lift and in particular a double-wide, independent platform parking lift in which at least one corner of each platform is supported by a cable during a portion of its vertical travel range.

Background & Description of Related Art

There are a variety of vehicle lifts available for raising a vehicle above a ground surface. These lifts are often employed to enable access to the underside of the vehicle for service, maintenance, and the like. A particular segment of lifts, known as parking lifts, is configured to provide additional parking space by lifting one vehicle to a sufficient height to enable a second vehicle to be parked beneath the first. Parking lifts can take a variety of forms including post lifts that include one, two, four, or more vertical posts that support one or more platforms on which one or more vehicles can be disposed. Parking lifts may be elements of mechanized or mechanical parking systems which are designed to minimize the total area required for parking the vehicles using multi-level garages, automated parking systems, stack parking, and the like that are generally powered by hydraulic or electrical motors or actuators.

Parking lifts generally include a platform on which the vehicle to be raised is positioned, in contrast to lifts for maintenance which generally include one or more lifting arms rather than a platform to avoid obstructing access to the underside of the vehicle. Parking lifts may be provided in parking facilities and vehicle service facilities and also by some vehicle enthusiasts to enable a number of vehicles to be temporarily stored in reduced amounts of space.

In a typical type of parking lift, a parking platform is guidingly supported by pairs of front and rear posts, and cables are routed by way of pulleys from the platform through the posts to a linear actuator, such as a hydraulic cylinder, in such a manner that extension and retraction of the actuator causes the platform to be raised and lowered. Such a parking structure and mechanism forms a single parking bay with lower and upper parking positions, as disclosed in FIG. 3 of U.S. Pat. No. 7,143,869, the disclosure of which is incorporated herein by reference. A similar second parking structure and mechanism can be provided adjacent the first structure to form a two-bay or double wide parking lift mechanism. An inconvenience of such a structure is the presence of center post assemblies which may impede access to vehicles parked on the lower lever. Another alternative to eliminate a center post is to provide a wider frame with a double wide parking platform to enable two vehicles to be parked in the raised position. However, this would require that two vehicles parked in the lower positions might have to be removed to enable even one vehicle on the raised platform to be retrieved.

There are various types of parking lifts in which the parking platforms are supported only by cables engaging corners of the platforms without engagements with posts of a supporting frame. Such practice is typical of parking systems known as "puzzle" parking systems. The term "puzzle parking" refers to an automated mechanical parking system employing parking platforms that can be shifted at least vertically and in some applications both vertically and horizontally to enable a number of vehicles to be parked and retrieved. Such systems are disclosed in U.S. Pat. Nos. 6,106,210 and 8,812,148, the disclosures of which are incorporated herein by reference. A problem with parking platforms which are solely supported by cables is the possibility of horizontal swinging of the platforms which may cause damage to structural components of the parking system or vehicles supported thereon.

SUMMARY OF THE INVENTION

The present invention provides embodiments of a double wide independent parking lift or vehicle lift apparatus having a vehicle lift platforms in which at least one of the platform corners only engages a guide structure when the platform has been raised toward an upper position thereof.

An embodiment of a parking lift includes: a vehicle lift frame including upstanding posts, each post having a guide track extending therealong; a vehicle lift platform supported by the frame and having laterally spaced sets of front and rear corners; a linear actuator operable to extend and retract; a cable assembly routed to engage the actuator, and the vehicle lift platform in such a manner as to cause the platform to be lowered to a lowered position to enable a first vehicle to park thereon and be raised to a raised position to enable a second vehicle to park on a support surface beneath the raised platform, in coordination with extension and retraction of the actuator. At least a first corner of the platform having a first guide member projecting therefrom which engages the guide track of an associated post. A receptacle depending from a support structure is aligned with at least a second corner of the platform having a second guide member projecting therefrom. The second guide member cooperates with the receptacle in such a manner that the second guide member engages the receptacle at a selected elevated height to thereby support the second corner when the platform is raised toward the raised position.

In one embodiment of the lift apparatus, the receptacle is elongated and depends from an elevated member of the frame. The second guide member is an elongated riser upstanding from the second corner of the platform and the riser is received in the receptacle as the platform approaches the raised position to thereby guide and support the second corner as the platform is raised toward the raised position. The riser and the receptacle may include a second corner ratchet mechanism having ratchet components positioned in the riser and the receptacle which cooperate to engage when the riser is received in the receptacle to positively support the second corner as the platform approaches the raised position. The ratchet components are releasable to enable lowering of the platform. In a similar manner, the guide track and the first guide member may include a first corner ratchet mechanism including ratchet components positioned in the guide track and the first guide member which cooperate to engage as the platform is raised to positively support the first corner and which are released to enable lowering of the platform.

In one embodiment of the vehicle lift apparatus, each of the front corners and one of the rear corners of the platform has one of the first guide assemblies projecting therefrom and engaging a guide track of an associated post and one of the rear corners of the platform has the second guide projecting therefrom which is aligned with the receptacle depending from the support structure. In another embodiment of the lift apparatus, each of the front and rear corners on one side of the platform has one of the first guide assemblies projecting therefrom and engaging a guide track of an associated post and each of the front and rear corners on an opposite side of the platform has one of the second guide assemblies projecting therefrom which is aligned with an associated receptacle depending from the support structure.

In another embodiment, the vehicle lift apparatus includes: a vehicle lift frame; a first lift platform and a second lift platform supported by the frame in laterally spaced relation, each platform having respective sets of front and rear corners; a first linear actuator and a second linear actuator associated respectively with the first and second platforms, each linear actuator being independently operable to extend and retract; a first cable assembly and a second cable assembly associated respectively with the first and second linear actuators, each cable assembly being routed to engage a respective one of the actuators and corners of the associated platforms to independently cause the platforms to be lowered to a lowered position to enable a first vehicle to park thereon and be raised to a raised position to enable a second vehicle to park on a support surface beneath the raised platform in coordination with extension and retraction of the associated actuator. At least a first corner of each platform having a first guide member projecting therefrom which engages the guide track of an associated post A respective receptacle is associated with each platform and depends from the support structure. Each receptacle is aligned with at least a second corner of the associated platform, the second corner of the associated platform having a second guide member projecting therefrom and the second guide member cooperating with the associated receptacle in such a manner that the second guide member engages the receptacle at a selected elevated height to thereby support the second corner when the associated platform is raised toward the raised position. The first and second platform may be substantially mirror images of one another, and components of the frame are configured to accommodate the platforms as configured.

In an embodiment of the lift apparatus, each receptacle may be elongated and depend from an elevated frame member, each second guide member may be an elongated riser upstanding from the second corner of the associated platform, and each riser is received in the associated receptacle when the platform approaches the raised position. The first guide members and associated posts and risers and receptacles may have cooperating ratchet members which engage at a selected height which are released to enable lowering of the platform. Each platform has front and rear outer corners and front and rear inner corners.

In one embodiment of the lift apparatus, the front and rear outer corners and the rear inner corner are similar to the first corner and include a first guide member to engage a post, while the front rear corner is similar to the second corner and includes a second guide member, such as a riser which engages a receptacle. In another embodiment of the lift apparatus, the front and rear outer corners are similar to the first corner, while the front and rear inner corners are similar to the second corner.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
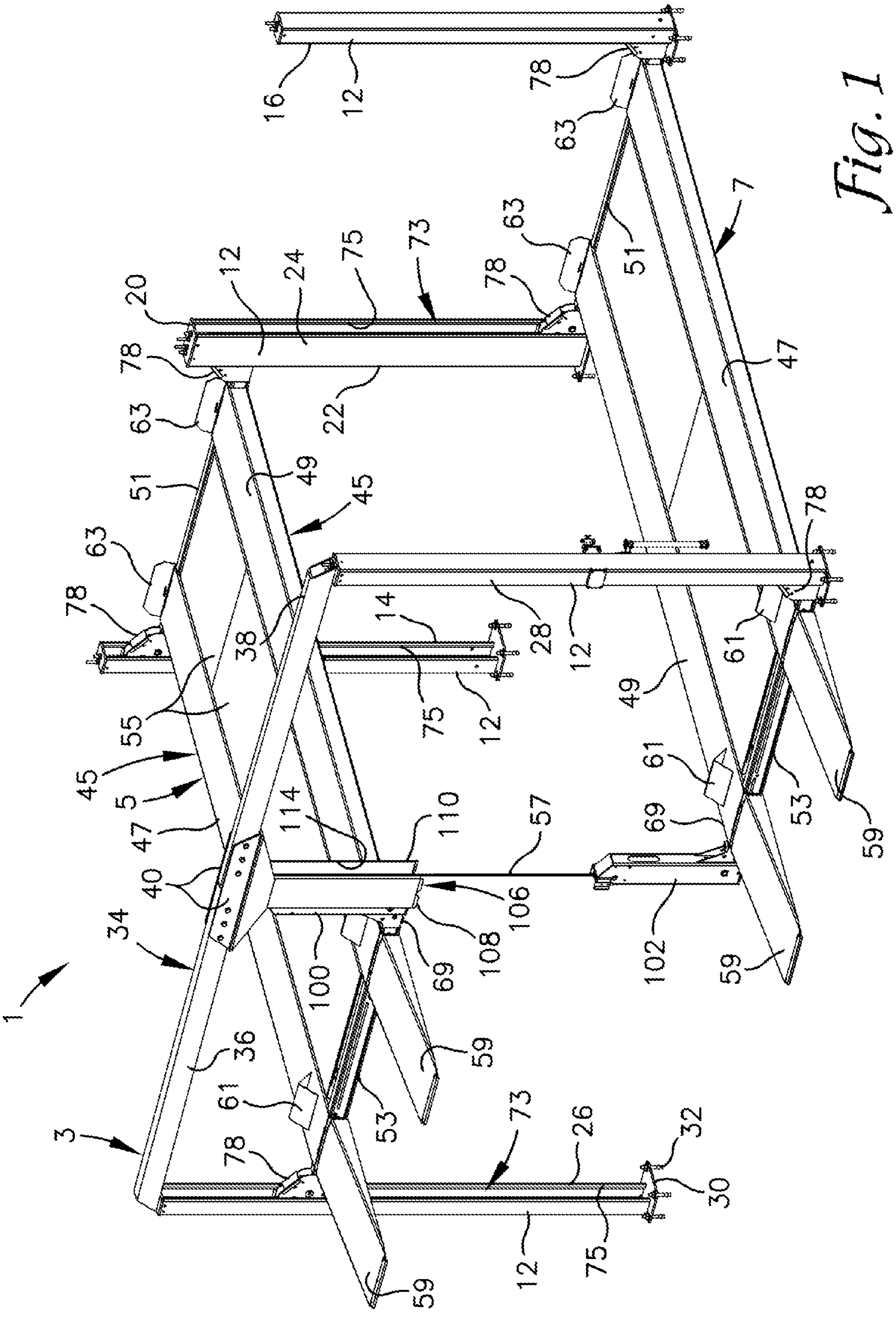
FIG. 1 is a perspective view of an embodiment of a double-wide, independent platform parking lift apparatus according to the present invention, showing a left-hand parking platform in a raised position and a right-hand parking platform in a lowered position.

Referring to the drawings in more detail, the reference number 1 generally designates an embodiment of a double-wide, independent platform vehicle lift apparatus according the present invention. The lift apparatus 1 generally includes a lift frame or framework 3 having a left-hand vehicle lift platform 5 and a right-hand vehicle lift platform 7 engaged therewith in such a manner as to enable independent movement of the platforms 5 and 7 between lower respective positions, as shown in FIG. 1 by the right-hand platform 7 and raised positions, as shown by the left-hand platform 5, by operation of respective linear actuators 9 (shown diagrammatically in FIG. 4). In the lower position, each of the platforms 5 and 7 may receive vehicles thereon for lifting to the raised position thereof to enable an additional vehicle to be parked thereunder.

Figure 2:
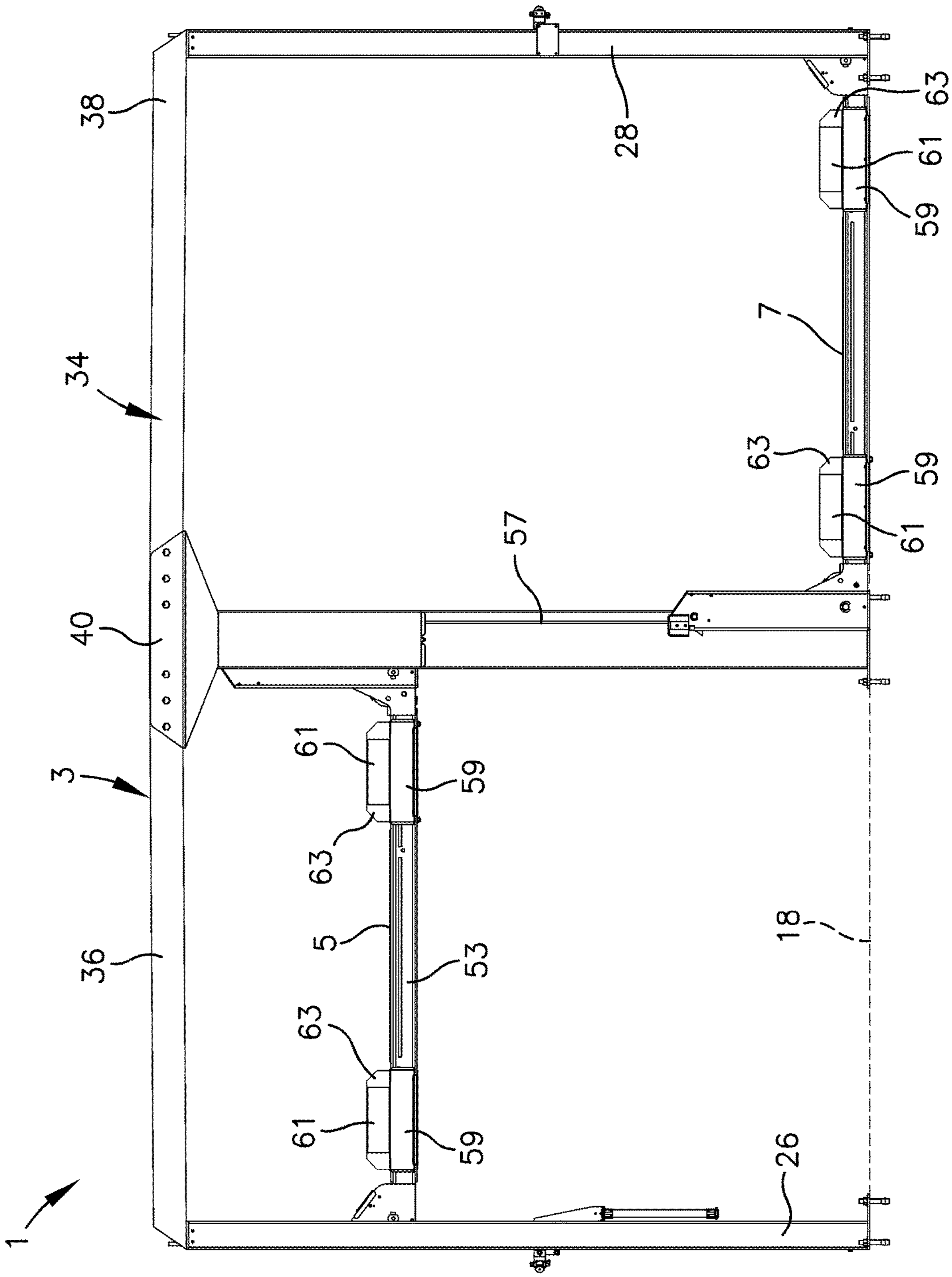
FIG. 2 is an enlarged front elevational view of the parking lift apparatus.

The illustrated vehicle lift framework 3 includes a plurality of posts 12 upstanding from a support surface 18 (FIG. 2) including laterally spaced, outside left and right rear posts 14 and 16. As used herein, the front or entry end of the lift apparatus 1 is considered to be the end of the lift 1 through which vehicles are driven into the lift apparatus 1 and the opposite end of the apparatus 1 is referred to as the rear end. A rear center post assembly 20, upstanding from the support surface 18, is positioned between the outside rear posts 14 and 16. The center post assembly 20 is formed by inside rear posts 22 and 24 joined together in back-to-back relation. The framework 3 additionally includes laterally spaced, outside left and right front posts 26 and 28 upstanding from the support surface 18, preferably in alignment with the outside rear posts 14 and 16. Each of the posts 12, including posts 14, 16, 22, 24, 26, and 28, has a respective base plate 30 secured thereto which is secured in place, as by bolts 32 embedded in the material forming the support surface 18, such as reinforced concrete. Upper ends of the front posts 26 and 28 are joined or connected together by an elongated horizontal structural member or assembly or support structure 34. The illustrated member 34 is formed by elongated left and right beams or structural members 36 and 38, which are joined at their inner ends by elongated front and rear connection plates 40. It is foreseen that upper ends of the rear posts 14 and 16 and the center post assembly 20 could be connected by a horizontal member or members (not shown).

Figure 4:
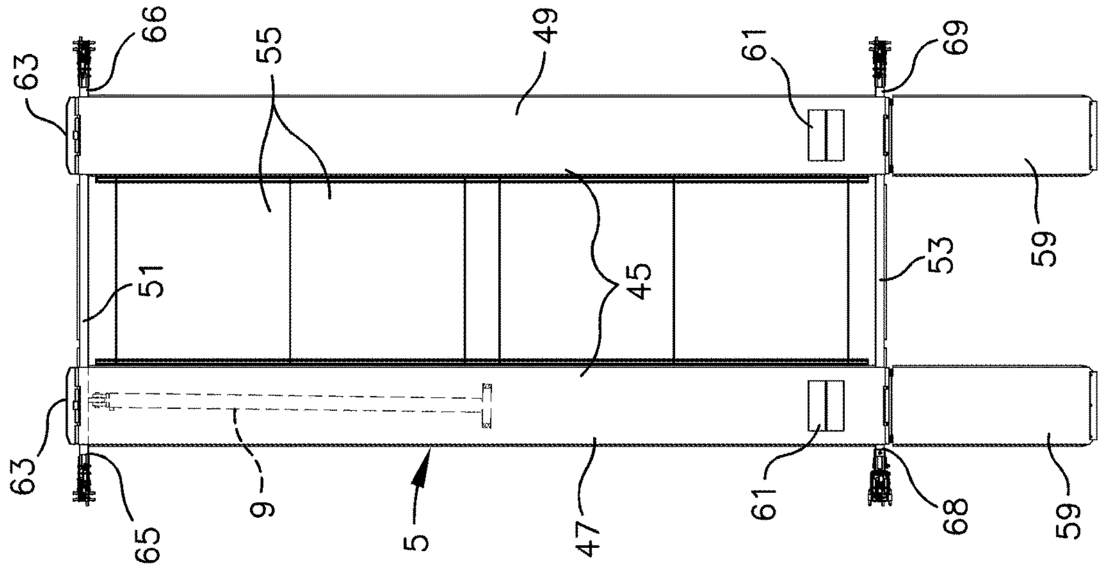
FIG. 4 is a top plan view of the left-hand platform and illustrates a linear actuator associated therewith in phantom lines.

Referring particularly to FIGS. 1 and 4, each of the vehicle lift platforms 5 and 7 is formed by a pair of elongated parking rails or tracks 45 including an outer parking track 47 and an inner parking track 49 which are joined in parallel relation by rear and front platform cross members 51 and 53 respectively. Space between the tracks 47 and 49 may be closed, as by solid deck plates or decks 55, which divert oil, grease, and other liquids from a vehicle parked on one of the platforms 5 or 7 from dripping onto a vehicle parked on the support surface 18 therebelow. Each of the platforms 5 and 7 has a linear actuator 9, such as a hydraulic actuator, positioned horizontally within the structure of one of the tracks 45 below the upper surface thereof. Each of the actuators 9 (see FIG. 4) has one or more cable assemblies or cables 57 (FIG. 1) connected thereto which are also connected to platforms 5 and 7 in such a manner as to raise and lower the platforms in coordination with extension and retraction of the associated actuator 9. The routing of cables 57 about pulleys (not shown) extending between the horizontally oriented actuators 9 and the platforms 5 and 7 may be configured in any of a number of ways, such as in the manner disclosed in PCT Publication WO/2020/224837, the disclosure of which is incorporated herein in its entirety by reference. Each of the tracks 45 may be provided with entry ramps 59 at the front or entry ends thereof to facilitate entry of a vehicle onto a vehicle lift platform 5 or 7.

In order to prevent a vehicle from unintentionally rolling off the platforms 5 and 7 in a forward direction, chocks 61 may be provided on each of the rails 45. The illustrated chocks 61 have angularly oriented front and rear surfaces and are of such a height to enable them to be driven over, but provide some resistance against uncontrolled rolling of a vehicle thereover. In order to prevent a vehicle from driving or rolling off a rear end of the platforms 5 and 7, each track 45 may be provided with a tire stop plate 63 at the rear end thereof. The tire stop plates 63 are of such a steep angle and height as to strongly resist a vehicle tire from rolling or being driven thereover.

Each of the platforms 5 and 7 has respective outer and inner rear corner areas or corners 65 and 66 and outer and inner front corner areas or corners 68 and 69 (see FIG. 4). The rear corners 65 and 66 of the platforms 5 and 7 are formed respectively by outer and inner ends of the rear cross member 51. Similarly, the front corners 68 and 69 of the platforms are formed respectively by the outer and inner ends of the front cross member 53. In general, the left and right vehicle platforms 5 and 7 are substantially similar; however, they are substantially mirror images of one another, as will be described further below.

Figure 6:
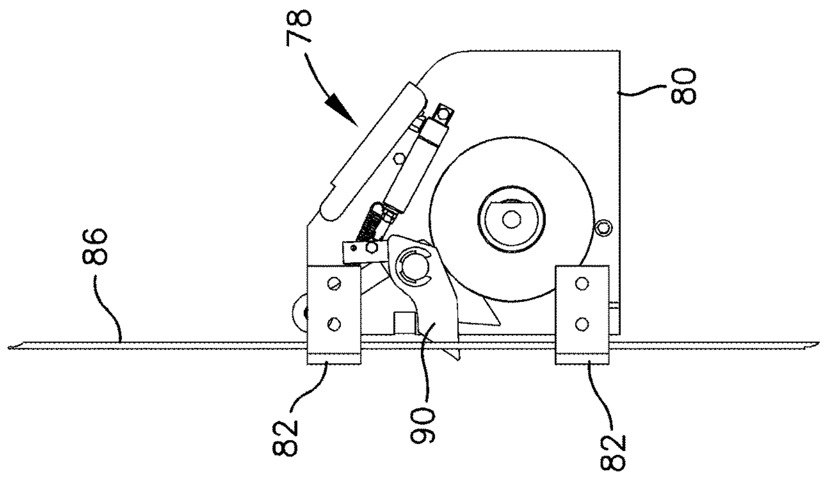
FIG. 6 is a further enlarged front elevational view of the post guide assembly having a guide support plate removed to illustrate a ratchet pawl thereof.
Figure 5:
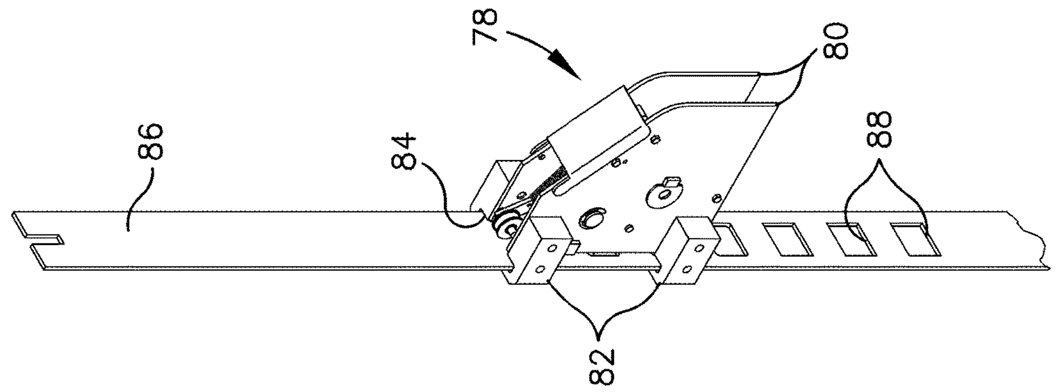
FIG. 5 is an enlarged fragmentary perspective view of a post guide assembly of the lift apparatus engaged with a post ratchet ladder plate.

Each of the posts 12 forms a guide structure or guide track 73 for vertical movement of the vehicle lift platforms 5 and 7 between the lower positions and upper positions. Each of the illustrated posts 12 has an elongated vertical guide slot 75 formed on an inward surface thereof which forms front and rear retaining edges therealong. Referring to FIGS. 5 and 6, the outer and inner rear corners 65 and 66 and outer front corner 68 of each platform 5 and 7 of the apparatus 1 has a corner guide assembly 78 which rides vertically within the guide slot 75 of the post 9 associated therewith.

Referring to FIGS. 5 and 6, each of the illustrated guide assemblies 78 includes a pair of guide support plates or guide plates 80 which are supported in spaced apart relation by inner members (not shown). The guide plates 80 support pairs of upper and lower slide bearings 82 or guides having inner notches 84 which ride along outer side surfaces of an elongated, vertically oriented post guide plate or ladder 86, forming a guide track for the post 12. The ladder 86, along with the guide slot 75, forms the guide track 73 of each post 12.

Figure 11:
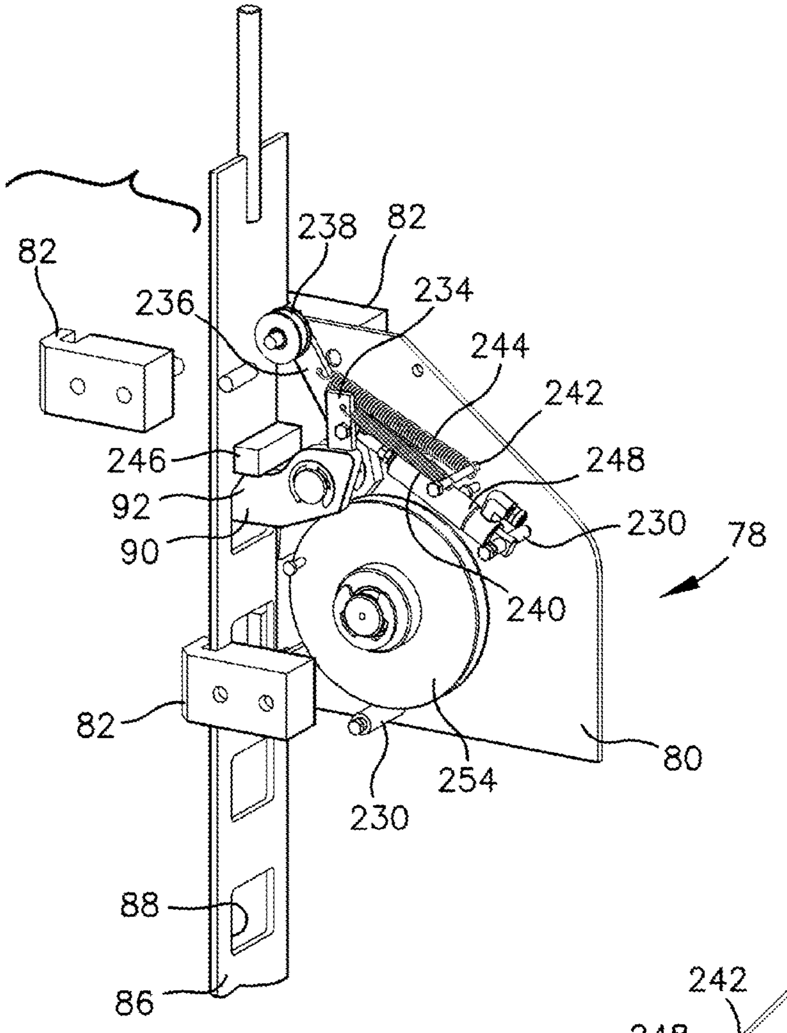
FIG. 11 is an enlarged, partially exploded, fragmentary perspective view of a platform corner guide assembly engaged with a ratchet ladder plate with one side plate removed to illustrate details of a ratchet pawl assembly thereof.
Figure 12:
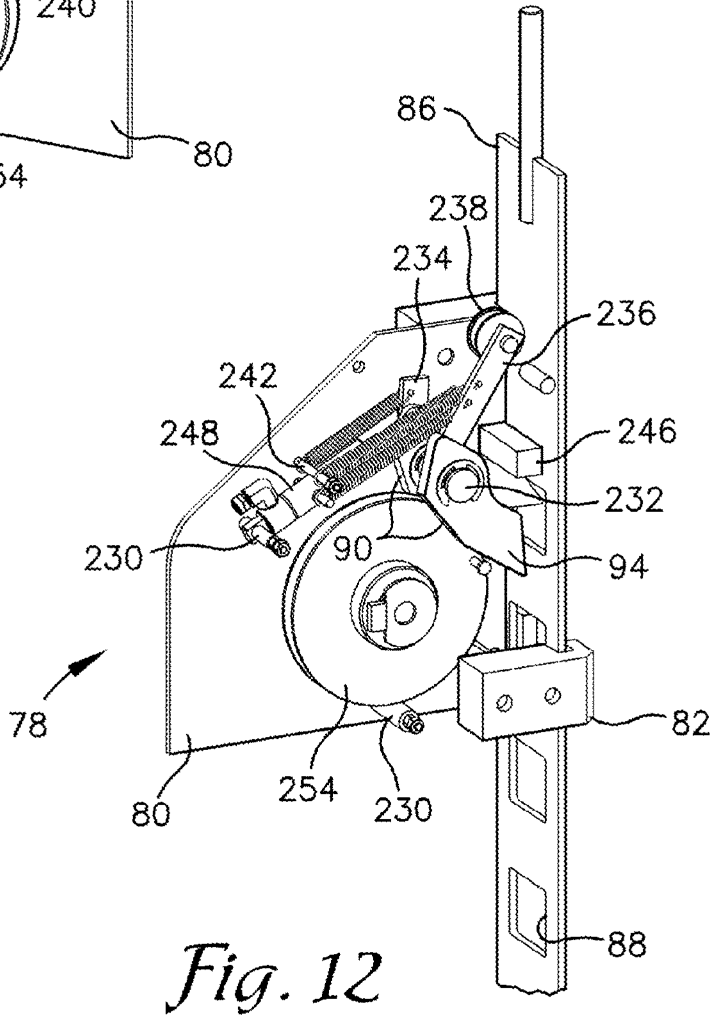
FIG. 12 is a view similar to FIG. 11, shown with an opposite side plate removed to illustrate details of the ratchet pawl assembly.

Each guide ladder 86 has a series of vertically spaced and aligned ratchet openings 88 formed therethrough. The ratchet openings 88 receive a ratchet pawl or pawl assembly 90 which is resiliently mounted in the guide assembly 78 to periodically engage the ratchet openings 88 as the guide assembly 78 is lifted along the ladder 86, to provide positive vertical support of the associated platform 5 or 7 in the event of failure of the actuator 9 or the cable 57. However, the mechanism of the pawl assembly 90 is of such a configuration that the pawl 90 is prevented from engaging the ratchet openings 88 during downward movement of the guide assembly 78 along the ladder 86. For example, the ratchet pawls 90 may include respective ratchet actuators which can be operated to retract the pawls 90, as illustrated in FIGS. 11 and 12, which will be described in further detail below. Additionally, while the guide ladder 86 shown in FIG. 5 has a series of ratchet openings near a top end thereof, it is foreseen that ratchet openings could be provided over a greater length of the ladder 86.

Referring to FIGS. 1 and 7-9, the illustrated inner front corners 69 of the vehicle lift platforms 5 and 7 are supported and guided in a manner that is different from the remaining corners 65, 66, and 68 thereof. The inner ends 69 of the front cross members 53 of each of the platforms 5 and 7 have riser assemblies or risers 100 and 102 upstanding therefrom. The horizontal support structure 34 has a riser receptacle assembly 106 depending therefrom at a center location in lateral alignment with the rear center post assembly 20. The receptacle assembly 106 is formed by short receptacle posts 108 and 110, similar to the posts 12 in cross-sectional shape, which are joined in back-to-back relation. Each of the receptacle posts or receptacles 108 and 110 has a guide slot 114 formed in an outwardly facing wall which forms front and rear retaining edges therealong. Each of the receptacles 108 and 110 has a ratchet ladder plate or ladder 116 (FIG. 7) secured therein which has a plurality of ratchet openings 118 spaced vertically therealong. The ladder plates 116 may be provided with mounting slots 120 to enable fine adjustment of the vertical relationship of the ladder plate 116 relative to the receptacles 108 and 110. The riser receptacle assembly 106 may be joined to a lower wall of the horizontal members 36 and 38 forming the horizontal member 34 by a center top plate 122 along with front and rear gusset plates 124 by the use of fasteners (not shown), welding, or the like. It is foreseen that the riser receptacle assembly 106 could be supported by other structural supports including structural supports that are not connected to the front posts 26 and 28 or could, for example, be connected to and depend from a ceiling in a building or room in which the lift framework 3 is placed.

Figure 9:
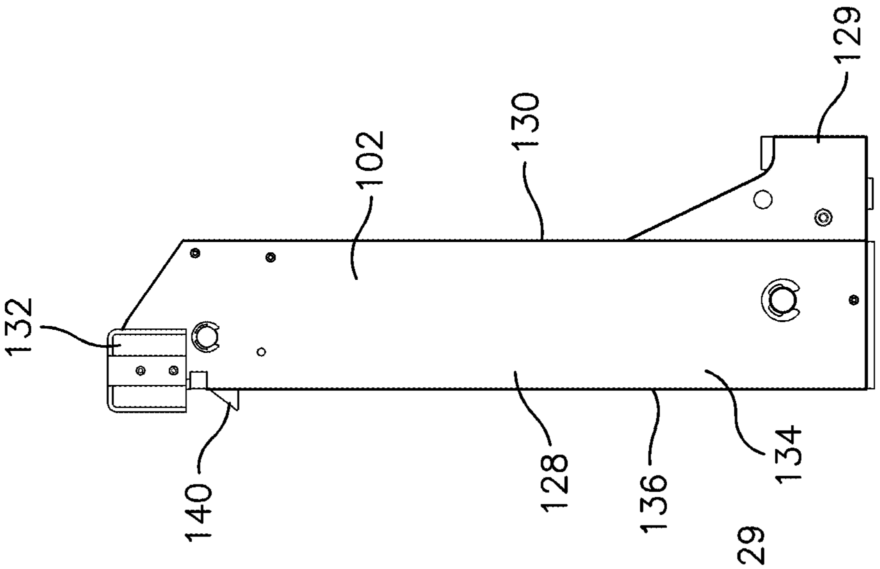
FIG. 9 is an enlarged front elevational view of the right-hand platform riser and illustrates a ratchet pawl thereof.
Figure 8:
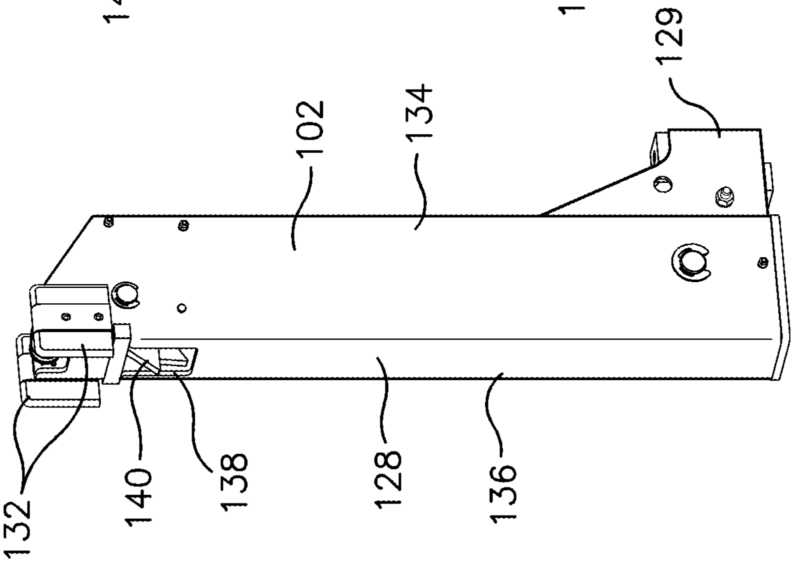
FIG. 8 is a fragmentary perspective view of a right-hand platform riser of the lift apparatus.
Figure 7:
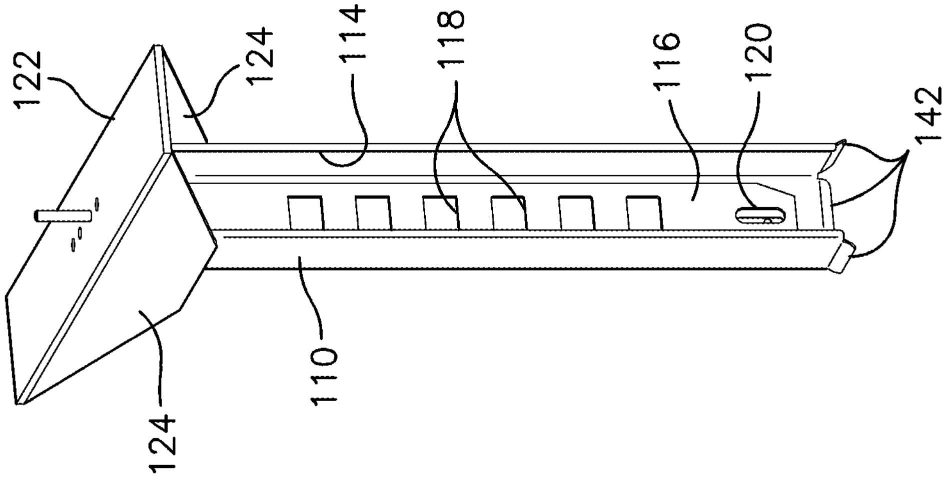
FIG. 7 is an enlarged fragmentary perspective view of a receptacle assembly of the parking lift apparatus and illustrates a ratchet ladder plate within a riser receptacle member thereof.

The risers 100 and 102 are substantially similar, and descriptions of components of the right-hand riser 102 shown in FIGS. 8 and 9 are applicable to the left-hand riser 102. The illustrated riser assembly 102 includes an elongated riser body 128 which may be formed by a length of rectangular tube stock. The riser body 128 has a lower gusseted connector structure 129 extending from an outer side 130 thereof for securing in upstanding relation to an inner end 69 of a front platform cross member 53. At an upper end of each riser body 128, a riser slide bearing member or bearing 132 is positioned on front and rear sides 134 of the riser body 128. The slide bearing 132 extends a short distance from the surface of an inner side 136 of the riser body 128. An opening 138 through the inner side 136 of the riser body 128 has a ratchet pawl or pawl assembly 140 extending outwardly therefrom. The ratchet pawl 140 is similar in construction and function to the ratchet pawl assembly 90 within the corner guide assemblies 78. The ratchet pawl 140 cooperates with the ratchet openings of the ladder plate 116 to positively support a portion of the weight of the associated platform 7, and vehicle thereon, when the riser 102 enters the associated receptacle 110 a sufficient distance. The slide bearings 132 engage inner surfaces of walls of the receptacle posts 108 and 110. Lower ends of the posts 108 and 110 may have downwardly and outwardly flared or angled deflector members 142 to correct possible initial misalignment of the slide bearings 132 with the receptacle assemblies 106.

Each of the risers 100 and 102 and receptacle post 108 and 110 has a portion of the cables 57 routed therethrough which cooperate with the actuators 9 to lift and lower the platforms 5 and 7. The actuators 9 associated with the platforms 5 and 7 can be operated independently. As either platform 5 or 7 is lifted to a selected height above the support surface 18, the ratchet pawls 90 in the associated corner guide assemblies engage the lowermost ratchet openings 88. Similarly, the ratchet pawls 140 of the risers 100 and 102 engage the lowermost ratchet openings 118 of the ladder plates 116 of the receptacle posts 108 and 110. The apparatus 1 may have sensors, such as limit switches (not shown), to detect when the ratchet pawls 90 and 140 engage the uppermost ratchet openings 88 and 118 respectively. At that level, the actuators 9 are deactivated. Preferably, the ratchet pawls 140 have mechanisms to cause them to be retracted prior to or during lowering of the platforms 5 or 7, similar to those described in U. S. Published Application No. 2020/0232238, the disclosure of which is incorporated herein by reference in its entirety. Preferably, lower ends of the receptacle posts 108 and 110 are at a sufficient height such that they would not be a bumping hazard to the majority of people. Similarly, the height of lower surfaces of the platforms 5 and 7, in their raised position, is at a sufficiently high level so as not to prevent a bumping hazard to the majority of people. When both platforms 5 and 7 are in their raised positions, there is no center post to obstruct entering and exiting from a vehicle parked beneath the raised platforms.

Figure 3:
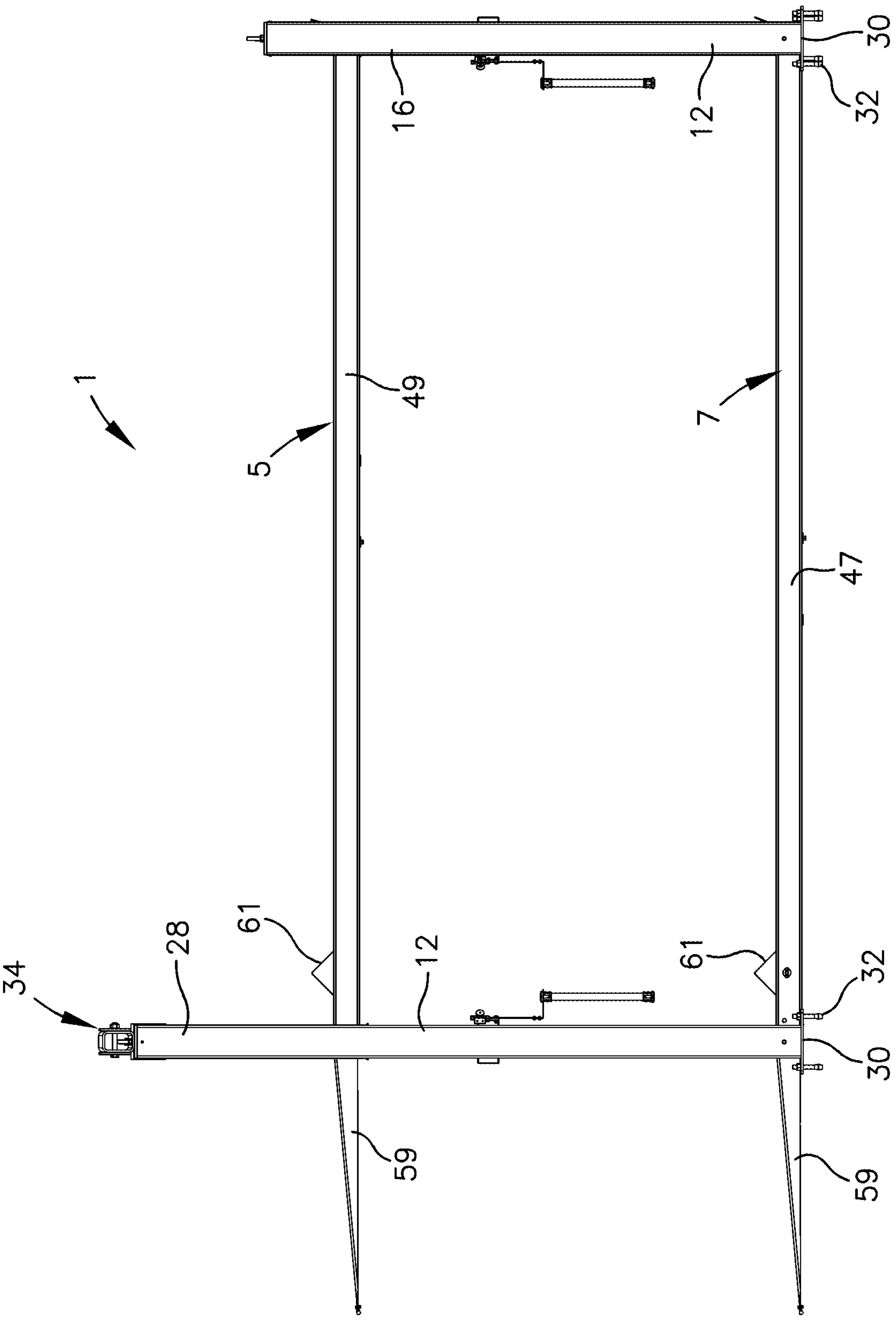
FIG. 3 is a side elevational view of the parking lift apparatus.
Figure 10:
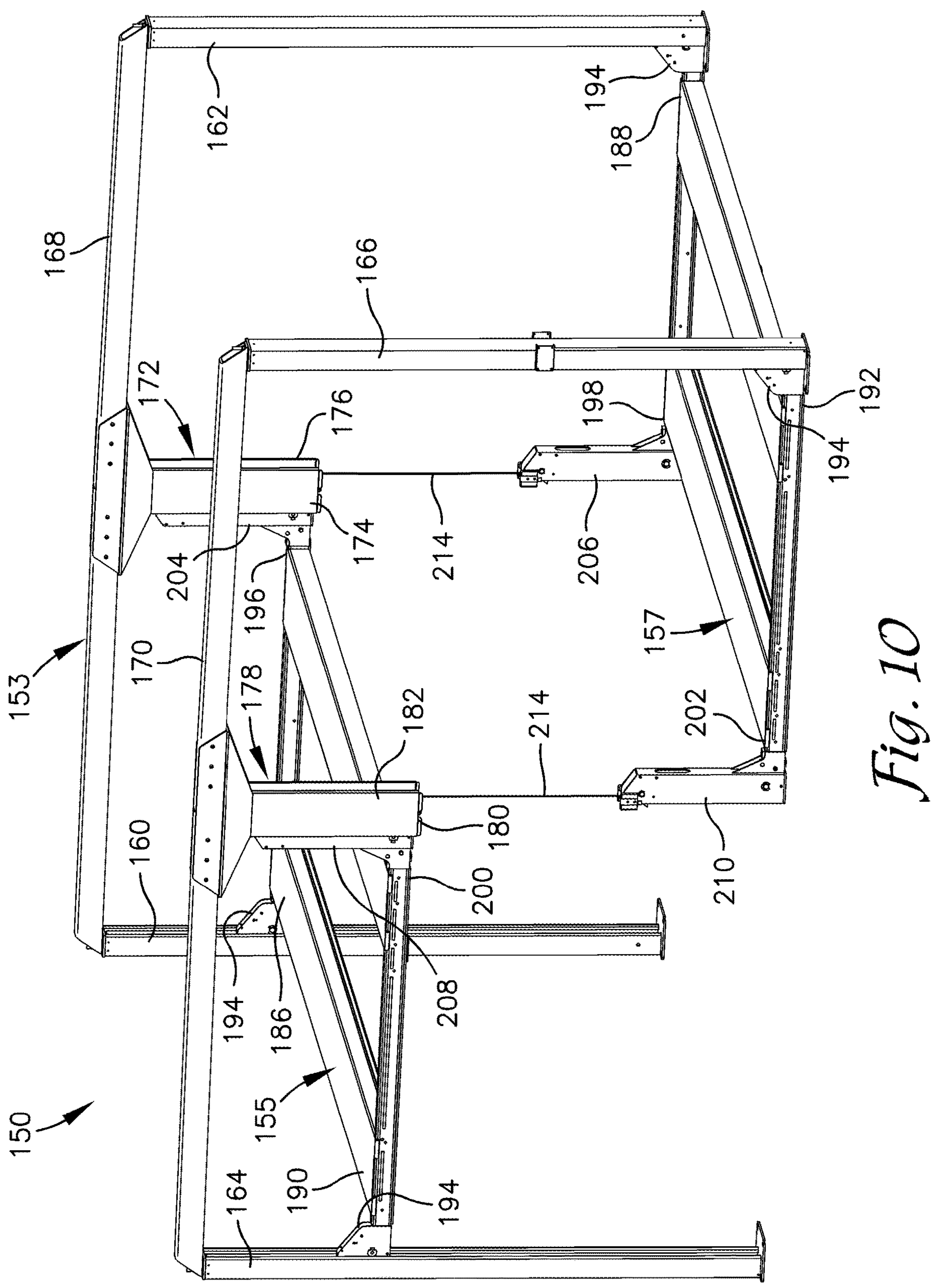
FIG. 10 is a perspective view of a modified embodiment of the double-wide, independent parking lift apparatus according to the present invention.

FIG. 10 illustrates a modified embodiment of a double-wide, independent platform vehicle lift apparatus 150 according to the present invention. The apparatus 150 includes lift framework or frame 153 which supports left and right vehicle lift platforms 155 and 157 in such a manner as to enable them to be lifted and lowered independently. The platforms 155 and 157 are substantially similar to the platforms 5 and 7, with differences described below. The illustrated frame 153 includes left and right rear posts 160 and 162 and left and right front posts 164 and 166 upstanding from a support surface, such as the support surface 18 (FIG. 3). The left and right rear posts 160 and 162 and left and right front posts 164 and 166 are substantially similar in construction and function similar to the left and right rear posts 14 and 16 and left and right front posts 26 and 28 respectively of the apparatus 1. A rear cross member assembly or member 168 extends between upper ends of the left and right rear posts 160 and 162. A front cross assembly or member 170 extends between upper ends of the left and right front posts 164 and 166. The rear cross member 168 has a rear riser receptacle assembly 172 depending therefrom. The rear riser receptacle 172 includes left and right rear receptacle posts 174 and 176. Similarly, the front cross member 170 has a front riser receptacle assembly 178 depending therefrom and is formed by left and right front receptacle posts 180 and 182. The rear and front riser receptacle assemblies 172 and 178 are substantially similar to the riser receptacle assembly 106 of the apparatus 1.

Left and right rear outer corners 186 and 188 and left and right front outer corners 190 and 192, respectively of the platforms 155 and 157, engage and are supported and guided by corner guide assemblies 194 which engage the posts 160, 162, 164, and 166, similar to the corner guide assemblies 87 of the apparatus 1. The corner guide assemblies 194 have ratchet components (not shown) similar to such components of the guide assemblies 78 and interact with complementary components in the posts 160, 162, 164, and 166. Left and right rear inner corners 196 and 198, respectively of the platforms 155 and 157, have respective left and right rear riser assemblies or risers 204 and 206 upstanding therefrom. Similarly, left and right front inner corners 200 and 202, respectively of the platforms 155 and 157, have respective left and right front riser assemblies or risers 208 and 210 upstanding therefrom. Each of the risers 204, 206, 208, and 210 is substantially similar to the risers 100 and 102 of the apparatus 1. The left and right rear risers 204 and 206 are vertically aligned respectively with the left and right rear receptacle posts 174 and 176. Similarly, the left and right front risers 208 and 210 are vertically aligned respectively with the left and right receptacle posts 180 and 182. The risers 204, 206, 208, and 210 enter and engage their respective receptacle posts 174, 176, 180 and 182 when the respective platforms 155 or 157 are raised to a selected vertical height. The risers and receptacle posts have cooperating ratchet components such that the platforms 155 and 157 are positively supported vertically by engagement of the risers with the respective receptacle posts.

As illustrated in FIG. 10, each of the rear and front risers 206 and 210 and respective receptacle posts 176 and 182 of the platform 157 has a portion of a cable assembly or cables 214 routed therethrough which cooperates with linear actuators (not shown) to lift and lower the platform 157. Similarly, the risers 204 and 208 and receptacles 174 and 180 of the platform 155 have cables (not shown) similar to the cables 214 routed therethrough and operated in a manner similar to the cables 214.

When both of the platforms 155 and 157 are in their raised positions, there is no center post obstructing access to vehicles parked below the raised platforms. However, a rear side of the apparatus 150 may be obstructed by a wall (not shown).

Referring to FIGS. 11 and 12, along with FIGS. 5 and 6, each of the illustrated corner guide assemblies 78 includes the side plates 80 secured in spaced apart relation by upper and lower spacer assemblies 230. The guide assemblies 78 slidably engage one of the vertically oriented ratchet ladder plates 86 by means of pairs of the spaced apart, upper and lower, notched slide bearing members 82 which are secured to the outer surfaces of the side plates 80. The illustrated pawl assembly 90 includes a primary ratchet pawl 92 (FIG. 11) and a backup or secondary ratchet pawl 94 (FIG. 12) which are pivotally supported, in axially spaced relation, on a pawl shaft 232 which is secured between the guide support plates 80.

The primary pawl 92 has a primary lever arm or lever 234 extending radially therefrom, and the backup pawl 94 has a backup lever arm or lever 236 extending radially therefrom. The illustrated backup lever 236 is longer than the primary lever 234 and has a cable roller 238 rotatably mounted at an outer end thereof which will be described further below. A primary tension spring 240 is engaged between the primary lever 234 and a spring anchor peg 242 extending between the side plates 80. Similarly, a backup tension spring 244 is engaged between the backup lever 236 and the anchor peg 242. The springs 238 and 242 bias their respective pawls 92 and 94 toward the ladder plate 86. A pawl catch block or stop member 246 is secured between the side plates 80 and limits pivoting motion of the pawls 92 and 94 so that either pawl supports the weight of an associated corner of the vehicle lift platform 5 or 7 when the pawl engages a lower edge of an aperture 88 in the ladder plate 86, by engagement of the pawl between the ladder plate 86 and the catch block 246. When a platform 5 or 7 is raised to the uppermost level, the platform 5 or 7 is normally kept vertically stationary by the closure of valves (not shown) within the associated lifting actuators 9 (FIG. 4). However, in the upper position of the platforms, the primary pawls 92 are positioned within horizontally aligned apertures 88 of the ladder plates 86, such that if an actuator 9 leaks or otherwise fails, engagement of the primary pawls 92 with the apertures 88 provides positive mechanical support of the associated platform 5 or 7.

The illustrated pawls 92 and 94 are retracted away from the ladder plate 86, as during lowering of a vehicle platform 5 or 7, by operation of an actuator 248 connected between one of the spacer assemblies 230 and the levers 234 and 236. The actuator 248 may be a pneumatic or hydraulic actuator or may be a solenoid. Extension of the actuator 248 overcomes the tension of the springs 240 and 244 and pivots the pawls 92 and 94 away from the ladder plate 86. It is foreseen that the primary spring 240 could be eliminated by use of a normally resiliently retracted actuator 248.

A cable pulley 254 is rotatably mounted between the side plates 80 and functions to route one of the cables 57 from a horizontal direction to a vertical direction. The cable 57 engages the pulley 254 along an under side thereof and around to the side of the pulley 254 adjacent the ladder plate 86. Additionally, the cable 57 engages the cable roller 238 at the end of the backup lever 236 on the side of the roller 238 facing away from the ladder plate 86. The cable 57 is normally in a taut condition, both when a platform 5 or 7 is being lifted or lowered and when stationary. As long as the cable 57 is taut, engagement of the cable 57 with the roller 238 keeps the backup pawl 94 pivoted away from the ladder plate 86. However, in the event of failure of a cable 57 or a lifting actuator 9, release of tension in the cable 57 enables the backup spring 244 to pivot the backup pawl 94 toward the ladder plate 86 to thereby engage one of the apertures 88 to thereby provide positive mechanical support of the associated platform 5 or 7. The combination of both pawls 92 and 94 provides reliable safety measures to the apparatus 1 and may also be included on the apparatus 150.

As used herein, the pawls 92 and 94 may be referred to as ratchet components located in the guide assemblies 73 or risers such as risers 100 and 102 and the ratchet openings 88 on ladder plates 86 may be referred to as ratchet components located or positioned in the guide tracks 73 in the guide slots 75. The ratchet openings 118 on the ladder plates 116 may be referred to as ratchet components located or positioned in the guide slots 114 of receptacles 108 and 110.

It is to be understood that while certain forms of the present invention have been described and illustrated herein, it is not to be limited to the specific forms or arrangement of parts described and shown.

What is claimed as new and desired to be secured by Letters Patent is:

1. A vehicle lift apparatus comprising:

(a) a vehicle lift frame including upstanding posts, each post having a guide track extending therealong;

(b) a vehicle lift platform supported by the vehicle lift frame and having laterally spaced sets of front and rear corners;

(c) a linear actuator operable to extend and retract;

(d) a cable assembly routed to engage the linear actuator and the vehicle lift platform in such a manner as to cause the vehicle lift platform to be lowered to a lowered position to enable a first vehicle to park thereon and to be raised to a raised position to enable a second vehicle to park on a support surface beneath the vehicle lift platform in the raised position, in coordination with extension and retraction of the linear actuator;

(e) at least a first corner of the laterally spaced sets of front and rear corners of the vehicle lift platform having a first guide member projecting therefrom which engages the guide track of an associated post;

(f) a receptacle depending from a support structure and aligned with at least a second corner of the laterally spaced sets of front and rear corners of the vehicle lift platform;

(g) the second corner having a second guide member projecting therefrom; and (h) the second guide member cooperating with the receptacle in such a manner that the second guide member engages the receptacle at a selected elevated height to thereby support the second corner when the vehicle lift platform is raised toward the raised position.

2. The vehicle lift apparatus as set forth in claim 1 wherein:

(a) the receptacle is elongated and depends from an elevated member of the frame;

(b) the second guide member is an elongated riser upstanding from the second corner of the vehicle lift platform; and (c) the elongated riser is received in the receptacle as the vehicle lift platform approaches the raised position to thereby guide and support the second corner as the vehicle lift platform is raised toward the raised position.

3. The vehicle lift apparatus as set forth in claim 2 and including;

(a) a second corner ratchet mechanism having a first ratchet component in the elongated riser and a second ratchet component in the receptacle which cooperate to engage when the elongated riser is received in the receptacle to positively support the second corner as the vehicle lift platform approaches the raised position, the first and second ratchet components being released to enable lowering of the vehicle lift platform.

4. The vehicle lift apparatus as set forth in claim 1 further comprising;

(a) a first corner ratchet mechanism including a first ratchet component on the guide track and a second ratchet component on the first guide member, the first and second ratchet components of the first corner ratchet mechanism cooperate to engage as the vehicle lift platform is raised to positively support the first corner and which are released to enable lowering of the vehicle lift platform.

5. The vehicle lift apparatus as set forth in claim 1 wherein:

(a) each of the rear corners and one of the front corners of the vehicle lift platform has one of the first guide members projecting therefrom and engaging a guide track of an associated upstanding post; and (b) one of the front corners of the vehicle lift platform comprises the second corner having the second guide member projecting therefrom and aligned with the receptacle depending from the support structure.

6. The vehicle lift apparatus as set forth in claim 1 wherein:

(a) each of the front and rear corners on one side of the vehicle lift platform has one of the first guide members projecting therefrom and engaging a guide track of an associated upstanding post; and (b) each of the front and rear corners on an opposite side of the vehicle lift platform has one of the second guide members projecting therefrom and aligned with an associated receptacle depending from the support structure.

7. A vehicle lift apparatus comprising:

(a) a vehicle lift frame including upstanding posts, each post having a guide track extending therealong;

(b) a first vehicle lift platform and a second vehicle lift platform supported by the frame in laterally spaced relation, each of the first and second vehicle lift platforms having respective sets of front and rear corners;

(c) a first linear actuator and a second linear actuator associated respectively with the first and second vehicle lift platforms, each of the first and second linear actuators being independently operable to extend and retract;

(d) a first cable assembly and a second cable assembly associated respectively with the first and second linear actuators, each of the first and second cable assemblies being routed to engage the respective first and second actuators, and each of the front and rear corners of the associated first and second vehicle lift platforms, such that independent operation of the first and second linear actuators causes the associated first and second vehicle lift platforms to be independently lowered to a lowered position to enable a first vehicle to park thereon and independently raised to a raised position to enable a second vehicle to park on a support surface beneath the first and second vehicle lift platform in the raised position;

(e) at least a first corner of each first and second vehicle lift platform having a first guide member projecting therefrom which engages the guide track of an associated upstanding post;

(f) a first receptacle and a second receptacle associated with a respective one of the first and second vehicle lift platforms and depending from a support structure, the first and second receptacles being aligned with a second corner of the associated first and second vehicle lift platforms;

(g) the second corner of the associated first and second vehicle lift platform having a second guide member projecting therefrom; and (h) the second guide member projecting from the associated first and second vehicle lift platform cooperating with the respective first and second receptacle in such a manner that the second guide member engages the respective first and second receptacle at a selected elevated height to thereby support the second corner when the associated first and second vehicle lift platform is raised toward the raised position.

8. The vehicle lift apparatus as set forth in claim 7 wherein:

(a) each first and second receptacle is elongated and depends from an elevated member of the frame;

(b) the second guide member of each of the first and second vehicle lift platforms is an elongated riser upstanding from the second corner of the associated first and second vehicle lift platform; and (c) each elongated riser is received in the respective first and second receptacle as the associated first and second vehicle lift platform approaches the raised position to thereby guide and support the second corner thereof as the associated first and second vehicle lift platform is raised toward the raised position.

9. The vehicle lift apparatus as set forth in claim 8 wherein:

(a) each first corner includes a first corner ratchet mechanism having a first ratchet component in the associated upstanding post and a second ratchet component in the associated guide member which cooperate to engage as the associated first and second vehicle lift platform is raised to positively support the first corner and which are released to enable lowering of the associated first and second vehicle lift platform; and (b) each second corner has a second corner ratchet mechanism having a first ratchet component in the associated elongated riser and a second ratchet component in the respective first and second receptacle which cooperate to engage when the elongated riser is received in the associated first and second receptacle to positively support the associated second corner as the associated platform approaches the raised position, the first and second ratchet components of the second corner ratchet mechanism of each second corner being released to enable lowering of the associated first and second vehicle lift platform.

10. The vehicle lift apparatus as set forth in claim 7 wherein:
(a) each vehicle lift platform has front and rear outer corners and front and rear inner corners;
(b) each of the front and rear outer corners and the rear inner corner of each vehicle lift platform is a first corner; and
(c) the front inner corner of each vehicle lift platform is a second corner.

11. The vehicle lift apparatus as set forth in claim 7 wherein:
(a) each vehicle lift platform has front and rear outer corners and front and rear inner corners;
(b) each of the front and rear outer corners of each vehicle lift platform is a first corner; and
(c) each of the front and rear inner corners of each vehicle lift platform is a second corner.

12. A vehicle lift apparatus comprising:
(a) a vehicle lift platform having a first front corner and a first rear corner on a first side of the vehicle lift platform and a second front corner and a second rear corner on a second side of the vehicle lift platform, the first front corner and first rear corner spaced laterally from the second front corner and the second rear corner;
(b) a first front track extending vertically and proximate the first front corner of the vehicle lift platform and a first rear track extending vertically and proximate the first rear corner of the vehicle lift platform;
(c) a first front guide projecting from the vehicle lift platform proximate the first front corner, the first front guide engaging the first front track as the vehicle lift platform is advanced between a lowered position and a raised position, a first rear guide projecting from the vehicle lift platform proximate the first rear corner, the first rear guide engaging the first rear track as the vehicle lift platform is advanced between the lowered position and the raised position, wherein in the raised position the vehicle lift platform is supported on the first front track and the first rear track by the first front guide and the first rear guide respectively at a height greater than the height of a vehicle to be parked below the vehicle lift platform;
(d) a second front guide projecting from the vehicle lift platform proximate the second front corner;
(e) a receptacle depending from a support structure and having a lower end extending in spaced relation above the second front guide;
(f) a linear actuator operable to extend and retract;
(g) a cable assembly routed to engage the linear actuator and the vehicle lift platform in such a manner as to cause the vehicle lift platform to be advanced between the lowered position and the raised position in coordination with extension and retraction of the actuator; and wherein
(h) when the vehicle lift platform is advanced toward the raised position, the second front guide engages the receptacle at a selected elevated height and supports the second front corner of the vehicle lift platform thereby.

13. A vehicle lift apparatus comprising:
(a) a left lift platform having a front inner corner, a rear inner corner, a front outer corner and a rear outer corner, the front outer corner and the rear outer corner spaced laterally outward from the front inner corner and the rear inner corner respectively;
(b) a right lift platform having a front inner corner, a rear inner corner, a front outer corner and a rear outer corner, the front outer corner and the rear outer corner spaced laterally outward from the front inner corner and the rear inner corner respectively;
(c) a left front outer track extending vertically and proximate the front outer corner of the left lift platform, a left rear outer track extending vertically and proximate the rear outer corner of the left lift platform, a right front outer track extending vertically and proximate the front outer corner of the right lift platform, and a right rear outer track extending vertically and proximate the rear outer corner of the right lift platform;
(d) a left front outer guide projecting from the left lift platform proximate the front outer corner of the left lift platform, the left front outer guide engaging the left front outer track as the left lift platform is advanced between a lowered position and a raised position;
(e) a left rear outer guide projecting from the left lift platform proximate the rear outer corner of the left lift platform, the left rear outer guide engaging the left rear outer track as the left lift platform is advanced between the lowered position and the raised position;
(f) a right front outer guide projecting from the right lift platform proximate the front outer corner of the right lift platform, the right front outer guide engaging the right front outer track as the right lift platform is advanced between a lowered position and a raised position;
(g) a right rear outer guide projecting from the right lift platform proximate the rear outer corner of the right lift platform, the right rear outer guide engaging the right rear outer track as the right lift platform is advanced between the lowered position and the raised position;
(h) a front support structure extending between and interconnecting the left front outer track and the right front outer track proximate upper ends thereof;
(i) a left front receptacle depending from the front support structure and having a lower end extending in spaced relation above a left front inner guide of the left lift platform;
(j) a right front receptacle depending from the front support structure and having a lower end extending in spaced relation above a right front inner guide of the right lift platform;
(k) a left linear actuator operable to extend and retract and a right linear actuator operable to extend and retract;
(l) a left cable assembly routed to engage the left linear actuator and the left lift platform in such a manner as to cause the left lift platform to be advanced between the lowered position and the raised position in coordination with extension and retraction of the left linear actuator; and
(m) a right cable assembly routed to engage the right linear actuator and the right lift platform in such a manner as to cause the right lift platform to be advanced between the lowered position and the raised position in coordination with extension and retraction of the right linear actuator; wherein:
(n) when the left lift platform is advanced toward the raised position, the left front inner guide engages the left front receptacle at a selected elevated height and supports the left front inner corner of the left lift platform thereby;
(o) when the right lift platform is advanced toward the raised position, the right front inner guide engages the right front receptacle at a selected elevated height and supports the right front inner corner of the right lift platform thereby; and wherein (p) in the raised, position the left lift platform and the right lift platform are supported at a height greater than the height of a vehicle to be parked below the left lift platform and the right lift platform respectively.

14. The vehicle lift apparatus as in claim 13 further comprising:

(a) a left rear inner track extending vertically and proximate the rear inner corner of the left lift platform, a right rear track extending vertically and proximate the rear inner corner of the right lift platform;

(b) a left rear inner guide projecting from the left lift platform proximate the rear inner corner of the left lift platform, the left rear inner guide engaging the left rear inner track as the left lift platform is advanced between the lowered position and the raised position; and (c) a right rear inner guide projecting from the right lift platform proximate the rear inner corner of the right lift platform, the right rear inner guide engaging the right rear inner track as the right lift platform is advanced between the lowered position and the raised position.

15. The vehicle lift apparatus as in claim 13 further comprising:

(a) a rear support structure extending between and interconnecting the left rear outer track and the right rear outer track proximate upper ends thereof;

(b) a left rear receptacle depending from the rear support structure and having a lower end extending in spaced relation above a left rear inner guide of the left lift platform; and (c) a right rear receptacle depending from the rear support structure and having a lower end extending in spaced relation above a right rear inner guide of the right lift platform; wherein (d) when the left lift platform is advanced toward the raised position, the left rear inner guide engages the left rear receptacle at a selected elevated height and supports the left rear inner corner of the left lift platform thereby; and (e) when the right lift platform is advanced toward the raised position, the right rear inner guide engages the right rear receptacle at a selected elevated height and supports the right rear inner corner of the right lift platform thereby.

* * * * *